US010304033B2

(12) United States Patent
Jones et al.

(10) Patent No.: US 10,304,033 B2
(45) Date of Patent: May 28, 2019

(54) DYNAMIC PROJECTION SYSTEM FOR A SHELVING UNIT

(71) Applicant: Walmart Apollo, LLC, Bentonville, AR (US)

(72) Inventors: Matthew Allen Jones, Bentonville, AR (US); Aaron James Vasgaard, Fayetteville, AR (US); Nicholaus Adam Jones, Fayetteville, AR (US); Robert James Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/700,523

(22) Filed: Sep. 11, 2017

(65) Prior Publication Data

US 2018/0075405 A1 Mar. 15, 2018

Related U.S. Application Data

(63) Continuation of application No. 62/395,005, filed on Sep. 15, 2016.

(51) Int. Cl.
*G06K 7/10* (2006.01)
*G06Q 20/20* (2012.01)
(Continued)

(52) U.S. Cl.
CPC ......... *G06Q 10/087* (2013.01); *G06K 7/1095* (2013.01); *G06Q 20/201* (2013.01); (Continued)

(58) Field of Classification Search
CPC ..... G09F 19/18; G09F 3/208; G09G 2380/04; G06K 7/1095
See application file for complete search history.

(56) References Cited

U.S. PATENT DOCUMENTS 5,382,779 A * 1/1995 Gupta .................... G06K 1/121 235/375
7,227,532 B2 6/2007 Bohn et al.
(Continued)

OTHER PUBLICATIONS

International Search Report and Written Opinion from related International Patent Application No. PCT/US2017/050900 dated Nov. 14, 2017.
Cassinelli, Alvaro et al., Camera-less Smart Laser Projector, https://www.researchgate.net/publication/228849009_Cameraless_ Smart_Laser_Projector, last viewed Jun. 15, 2016.

*Primary Examiner* — Suezu Ellis
(74) *Attorney, Agent, or Firm* — McCarter & English, LLP; David R. Burns

(57) ABSTRACT

Described in detail herein are methods and systems for dynamic projection. The dynamic projection system includes a projector configured to project a first set of information associated with a set of like physical objects onto a front portion of a shelving unit. The first set of information includes an image of a machine-readable element encoded with an identifier associated with the set of like physical objects. An optical scanner can scan and decode the identifier from the image of the machine-readable element. The optical scanner can transmit the identifier or location of the scanner to a computing system. The computing system can further control an output of the projector to dynamically project the second set of information associated with the set of like physical objects onto the front portion of the shelving unit receiving the identifier or location of the optical scanner.

14 Claims, 6 Drawing Sheets

(51) Int. Cl.
*G06Q 10/08* (2012.01)
*G09F 3/20* (2006.01)
*G09F 27/00* (2006.01)
*G09F 23/06* (2006.01)

(52) U.S. Cl.
CPC .............. *G09F 3/208* (2013.01); *G09F 23/06* (2013.01); *G09F 27/005* (2013.01); *G09G 2380/04* (2013.01)

(56) References Cited

U.S. PATENT DOCUMENTS

| | | | | |
|---|---|---|---|---|
| 9,157,617 | B1 | 10/2015 | Williams et al. | |
| 2005/0215431 | A1* | 9/2005 | Hiyoshi | B41M 5/34<br>503/226 |
| 2006/0042105 | A1 | 3/2006 | McGrail et al. | |
| 2008/0230497 | A1 | 9/2008 | Strickland et al. | |
| 2012/0029994 | A1 | 2/2012 | Barkan et al. | |
| 2013/0119138 | A1 | 5/2013 | Winkel | |
| 2013/0176398 | A1* | 7/2013 | Bonner | G09F 19/18<br>348/46 |
| 2013/0223673 | A1 | 8/2013 | Davis et al. | |
| 2013/0293581 | A1* | 11/2013 | Wissner-Gross | G06T 19/006<br>345/633 |
| 2014/0101000 | A1 | 4/2014 | Falls et al. | |
| 2015/0041616 | A1 | 2/2015 | Gentile et al. | |
| 2015/0310539 | A1 | 10/2015 | McCoy et al. | |
| 2016/0328767 | A1* | 11/2016 | Bonner | G06Q 30/0625 |

* cited by examiner

DYNAMIC PROJECTION SYSTEM FOR A SHELVING UNIT

CROSS-REFERENCE TO RELATED PATENT APPLICATIONS

This application claims priority to U.S. Provisional Application No. 62/395,005 filed on Sep. 15, 2016, the content of which is hereby incorporated by reference in its entirety.

BACKGROUND

It can be a long and error prone process to change labels on shelves associated with physical objects.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are methods and systems for dynamic projection. The dynamic projection system includes a projector configured to project a first set of information associated with a set of like physical objects onto a front portion of a shelving unit. The first set of information includes an image of a machine-readable element encoded with an identifier associated with the set of like physical objects. An optical scanner can scan the projection of the image of the machine-readable element and decode the identifier from the machine-readable element. A computing system communicatively coupled to the projector and the optical scanner, can query a database using the identifier to retrieve a second set of information associated with the set of like physical objects. The computing system can further control an output of the projector to dynamically project the second set of information associated with the set of like physical objects onto the front portion of the shelving unit in place of the first set of information associated with the set of like physical objects and in response to the optical scanner scanning the image of the machine-readable element. The front portion of the shelving unit can be at a predetermined angle and the projector is configured to project the first and second sets of information at the predetermined angle. The projector is configured to render the first set of information in a first color and render the second set of information in a second color.

The optical scanner further includes a location module configured to output location information associated with the optical scanner to the computing system. The computing system is further programmed to determine the location of the optical scanner in response to receipt of the location information, query a database to retrieve an identification of a set of like physical objects disposed at the location, identify the projector as being closest in proximity to the location of the optical scanner, and control the projector to output a third set of information on the front portion of the shelving unit (e.g., in place of the first set of information). The computing system is further programmed to control the projector to output the first set of information on the front portion of the shelving unit subsequent to outputting the second set of information on the front portion of the shelving unit based on determining a distance between the shelving unit and the optical scanner is greater than a predetermined threshold.

The optical scanner is configured to scan the image of the machine-readable element by detecting a pulse/strobe rate, frequency, or pattern at which the projector renders the image. The pulse rate is unique to the identifier encoded in the image of the machine-readable element. The optical scanner decodes the identifier from the machine-readable element based on the pulse rate, frequency, or pattern.

Figure 1A:
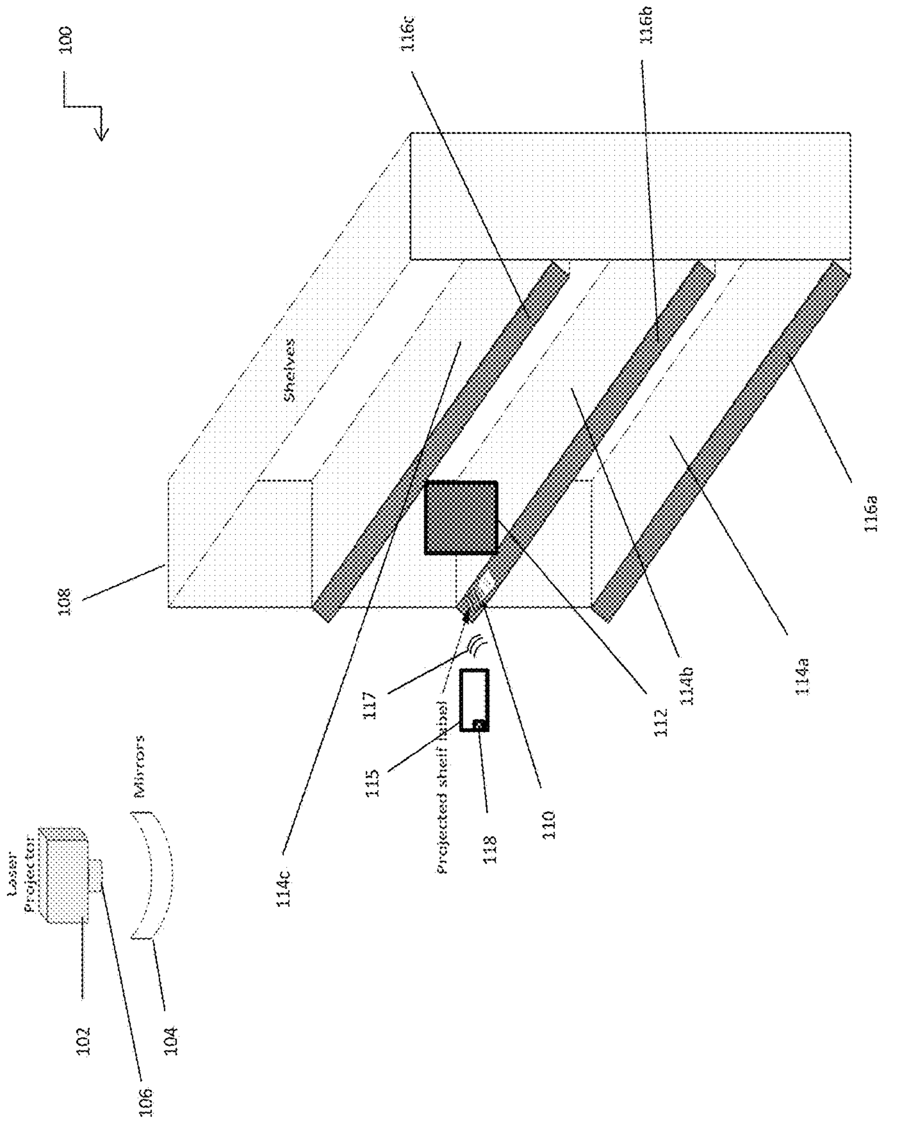
FIG. 1A is a diagram of a laser projector disposed with respect to a shelving unit in a facility according to the present disclosure.

FIG. 1A is a schematic diagram a laser projector 102 disposed with respect to a shelving unit 108 in a facility. The shelving unit 108 and the laser projector 102 can be disposed in a facility 100. The shelving unit can include shelves 114*a-c* and each of the shelves can include front portions/faces 116*a-c*. The front portions 116*a-c* can be disposed at a predetermined angle. Physical objects 112 can be disposed on the shelves 114*a-c*. The laser projector 102 can include a lens 105 and mirrors 104. A laser projector 102 can produce light by emitting lasers at various pulse rates. The light can create an image which can be projected onto an area.

The laser projector 102 can be configured to project an image of a projected label 110 including first set of information associated with the physical objects 112 onto the front portion 116*a-c* of the shelves as a projected label 110. For example, the laser projector 102 can project an image of the projected label 110 through the lens 106 which can reflect off of the mirrors 104 and projects the image of the projected label 110 on the front portion 116*b* of the shelf 114*b*. The mirrors 104 can be positioned in a pre-determined angle so that in response to the image of the projected label 110 being reflected off of the mirrors 104, the image of the projected label 110 can be projected on the front portion 116*b* of the shelf at the same angle at which the front portion 116*b* of the shelf is disposed. The first set of information can include an image of the machine-readable element encoded with an identifier associated with the physical objects 112 and/or other information associated with the physical objects. The laser projector 102 can be configured to project the image of the projected label 110 at a predetermined pulse rate or pattern. Each set of like physical objects disposed on the shelving unit can have a different projected label. Each projected label on the shelving unit 108 can be projected at a different pulse rate or with a different pulse pattern. A pulse rate is the number of times a pulsed activity occurs or a pulse repetition frequency (PRF). A pulse pattern is a sequence of light pulses where the duration of the light pulses and the time between the light pulses can be varied according to a pattern.

In exemplary embodiments, an optical scanner 115 can be configured to scan and read the image of the machine-readable element from the projected label 110. The optical scanner 115 can be configured to determine the pulse rate or pattern at which the image of projected label is being projected. For example, the optical scanner can be placed over a project label such that the projected label impinges upon the optical scanner, and optical sensors can in the optical scanner can detect the pulse rate or pattern. The optical scanner 115 can decode an identifier in the projected label based on the pulse rate or pattern. The optical scanner 115 can detect the pulse rate based on ambient light of the projected image pulsating in a predetermined pattern on the front portion of the shelving unit. The optical scanner 115 can transmit the decoded identifier to a computing system.

In some embodiments, the optical scanner 115 can include a location module 118. The location module 118 can use a positioning system, such as Geographical Positioning System (GPS) technology or an inertial positioning system to determine the location of the optical scanner 115 in the facility 100. The location module 118 can encode the location in the facility 100 in electrical signals and transmit the electrical signals after a predetermined amount of interval of time to the computing system. In addition, or in the alternative, the location of the optical scanner can be determined based on emissions from the optical scanner that are received by sensors or receivers disposed throughout the facility (e.g., using triangulation based on the strength of the signals received by the sensors or receivers and the location of the sensors or receivers). In some embodiments, the sensors or receivers can be integrated into the projector.

Figure 1B:
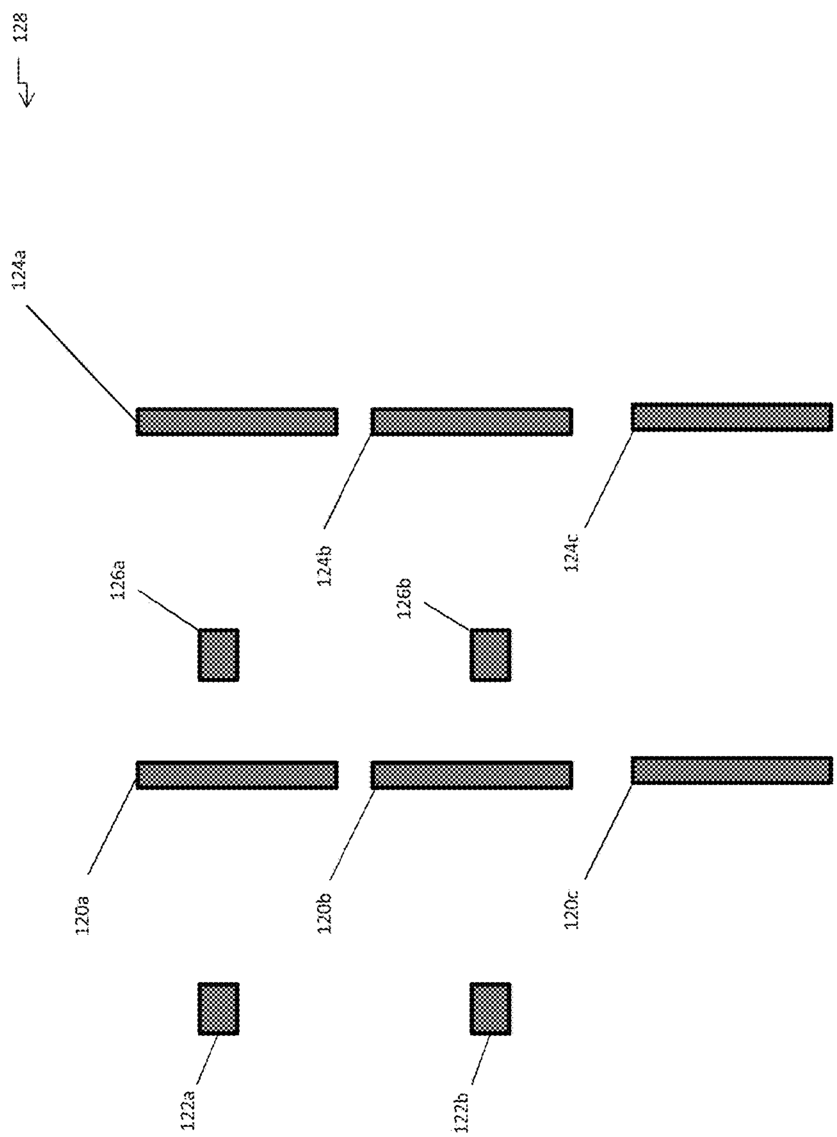
FIG. 1B is a block diagram of laser projectors disposed with respect to shelving units in a facility according to the present disclosure.

FIG. 1B is a block diagram of laser projectors disposed with respect to shelving units in a facility. In exemplary embodiments, laser projectors 122*a-b* and 126*a-b* can be disposed throughout the facility 128 with respect to the shelving units 120*a-c* and 124*a-c*. As described herein, the laser projectors 122*a-b* and 126*a-b* can be configured to project a projected label on the front portion of the shelving units 120*a-c* and 124*a-c*. The laser projector closest to the shelving unit can project the projected labels on the shelving unit. For example, laser projector 122*a* can project projected labels on shelving unit 120*a* and a part of shelving unit 120*b*. Furthermore, laser projector 122*b* can project projected labels on part of shelving unit 120*b* and shelving unit 120*c*. Likewise, laser projector 126*a* can project projected labels on shelving unit 124*a* and a part of shelving unit 124*b* while laser projector 126*b* can project projected labels on the other part of shelving unit 124*b* and shelving unit 124*c*.

Figure 2:
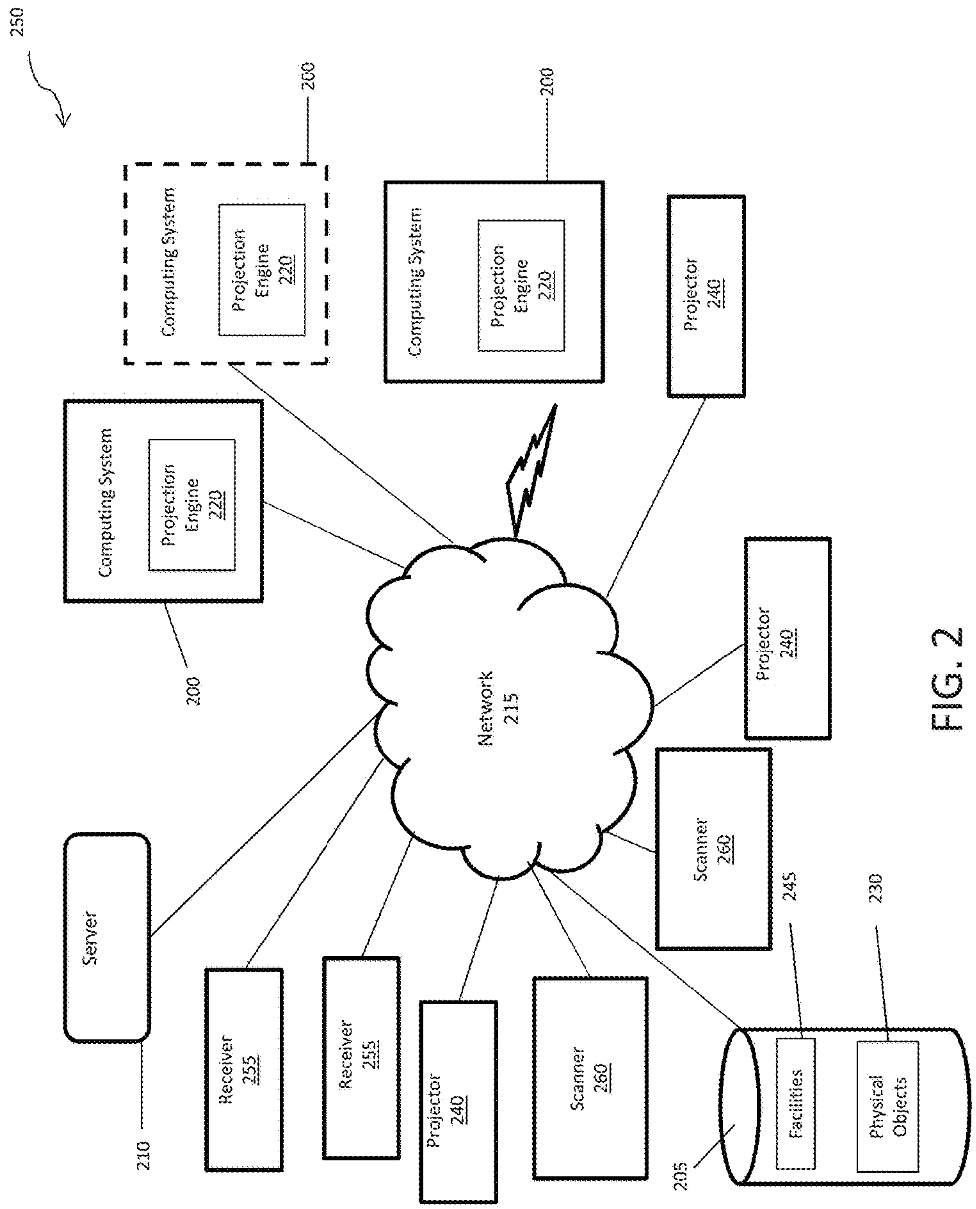
FIG. 2 illustrates an exemplary dynamic projection system in accordance with exemplary embodiments of the present disclosure.

FIG. 2 illustrates an exemplary dynamic projection system 250 in accordance with exemplary embodiments of the present disclosure. The dynamic projection system 250 can include one or more databases 205, one or more servers 210, one or more computing systems 200, the projectors 240, and scanners 260. In exemplary embodiments, the computing system 200 can be in communication with the databases 205, the server(s) 210, the projectors 240, and scanners 260 via a communications network 215. The computing system 200 can implement at least one instance of a projection engine 220 configured to implement dynamic projection processes of the dynamic projection system 250.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 200 and the databases 205, via the network 215. The server 210 hosts one or more applications configured to interact with one or more components of the computing system 200 and/or facilitates access to the content of the databases 205. In some embodiments, the server 210 can host the projection engine 220 or portions thereof. The databases 205 may store information/data, as described herein. For example, the databases 205 can include a physical objects database 230 and the facilities database 245. The physical objects database 230 can store physical objects disposed in a facility. The facilities database 245 can include information associated with the facility. The databases 205 and server 210 can be located at one or more geographically distributed locations from each other or from the computing system 200. Alternatively, the databases 205 can be included within server 210.

In exemplary embodiments, the computing system 200 can receive an identifier decoded by the scanner 260 from the projection of the image first set of information including a machine-readable element encoded with the identifier associated with a set of like physical objects. The computing system 200 can execute the projection engine 220 in response to receiving the identifier. The projection engine 220 can query the physical objects database 230 using the identifier to retrieve a second set of information associated with the physical object. The second set of information can include but is not limited to: the name of the set of like physical objects, type of the set of like physical objects, the quantity of set of like physical objects disposed in the facility, and the location of the physical object in the facility. In some embodiments, the location can include the exact shelving unit in which the set of like physical objects are disposed. The projection engine 220 can query the facilities database 245 to determine the closest projector 240 in proximity to the location of the set of like physical objects. The projection engine 220 can control the determined the projector 240 that is currently projecting the first set of information and can control the projector to project an image of the second set of information associated with the set of like physical objects on the front portion of the shelving unit in place of the first set of information.

In some embodiments, the projection engine 220 can query the facilities database 245 to determine the angle at which the front portion of the shelving unit is disposed. The projection engine 245 can control the mirrors of the projector 240 to adjust the reflection of the projection so that projection of the image of the second set of information is at the same angle as the front portion of the shelving unit. In some embodiments, projection engine 220 can control the image of the first set of information to be projected in a first color and the image of the second set of information projected in a second color. In other embodiments, the projection engine 220 can determine the color in which the image of the second set of information will be projected based on the an element in the second set of information. For example, the projection engine 220 can control the projector 240 to project the image of the second set of information in first color (e.g., red) in response to determining the quantity of the set of like physical objects is running low in the facility or in a second color (e.g., green) in response to determining the quantity of the set of like physical objects in the facility exceeds a threshold quantity.

In some embodiments, the scanner 260 can include a location module. The location module can be configured to encode location information of the scanner 260 into electrical signals and transmit the electrical signals to the computing system 200 on a periodic basis as the scanner travels around the facility. The computing system 200 can receive the electrical signals from the location module. The computing system 200 can execute the projection engine 220 in response to receiving the electrical signals. The projection engine 220 can decode the location information from the electrical signals. The projection engine 220 can query the physical objects database 230 using the location information to retrieve various sets of like physical objects disposed closest in proximity to the location of the scanner 260. The projection engine 220 can determine a second (or third) set of information can be projected for at least one set of like physical objects. The projection engine 220 can determine the second set of information can be projected based on an element in the second information. The projection engine 220 can further determine a set of information can be projected associated with the scanner 260 (or the user of the scanner 260). The projection engine 220 can query the facilities database 245 to determine the closest projector 240 to the location of the scanner 260. The projection engine 220 can control the determined closest projector 240 to project the image of the second (or third) set of information associated with the set of like physical objects or the scanner 260. For example, the projection engine 220 can project information about the a quantity of the physical object in the facility, a location of additional ones of the physical objects in the facility, a description of the physical objects, and the like, and/or can project information to the user of the scanner such as messages, tasks, and the like. Therefore, the projection engine 220 can change the projected image based on either the identifier extract from a scanned machine-readable element or can be change the projected image based on the scanner being in proximity to the shelving unit without receiving an identifier from a scanned machine-readable element.

In some embodiments, the scanner 260 an be implemented as a beacon generating device configured to transmit beacon signals after predetermined time intervals. Furthermore, receivers 255 configured to detect the beacon signals within a predetermined distance can be disposed throughout the facility. The beacon signal can include an identifier associated with the scanner 260. The receivers 255 can encode the detected beacon signal and the strength of the signal in an electrical signal and transmit the electrical signal to the computing system 200. The computing system 200 can execute the projection engine 220 in response to receiving the electrical signals. The projection engine 220 can decode the beacon signal and the strength of the signal from the electrical signals. The projection engine 220 can query the facilities database 245 using the identifier of the scanner 260 to determine the identification information of the scanner 260. The projection engine 220 can determine a second (or third) set of information can be projected for at least one set of like physical objects. The projection engine 220 can determine the second set of information can be projected based on an element in the second information. The projection engine 220 can further determine a set of information can be projected based on the identification information of the scanner. The projection engine 220 can query the facilities database 245 to determine the closest projector 240 location of the scanner based on the beacon signal and signal strength. The projection engine 220 can control the determined closest projector 240 to project the image of the second (or third) set of information associated with the set of like physical objects or a set of information based on the identification information of the scanner 260. In some embodiments, the scanner 260 can output wireless signals to the computing system 200. The computing system 200 can determine the location of the scanner 260 based on the strength of wireless signals.

As a non-limiting example, the dynamic projection system 250 can be implemented in a retail store. The projectors 260 can be disposed in the retail store with respect to shelving units in which products sold at the retail store are disposed. The scanners 240 can be operated by users roaming the retail store. The users can be store employees or customers. In exemplary embodiment, a projector 260 can project an image of a first set of information associated with a set of like products on the front portion of the shelving unit. The first set of information can include a machine-readable element encoded with an identifier associated with the set of like products, the name of the set of like products and the price of the set of like products. A user can scan the machine-readable element using a scanner 260. The scanner 260 can scan and decode the identifier from the machine readable element based on the pulse rate at which the image of the first set of information is being projected. The scanner 260 can transmit the identifier to the computing system 200.

The computing system 200 can receive the identifier associated with the set of like products. The computing system 200 can execute the projection engine 220 in response to receiving the identifier. The projection engine 220 can query the physical objects database 230 to retrieve a second set of information of the set of like products and the location of the set of like products in the retail store. The second set of information can include the name of the set of like products, the brand of the set of like products, the quantity of set of like products available at the retail store and/or any coupons associated with the set of like products. The projection engine 220 can query the facilities database 245 to determine the closest projector 240 to the location of the set of like products. The projection engine 220 can control the determined closest projector 240 to change the projected image of the first set of information to project the image of the second set of information. The projection engine 220 can control the determined closest projector to project the image of the first set of information in a first color and project the image of the second set of information in a second color. In some embodiments, the projection engine 220 can determine the color in which the image of the second set of information will be projected at based on an element in the second set of information associated with the set of like products. For example, the projection engine 220 can instruct the projector 240 to project the image of the second set of information in red if the set of like products is running out of stock. Alternatively, the projection engine 220 can instruct the projector 240 to project the image of the second set of information in green if there is a promotion associated with the set of like products.

In some embodiments, a user can be roaming the retail store with the scanner 260. The scanner 260 can include a location module which is configured to encode the location information of the scanner 260 into electrical signals as it roams around the retail store and transmit the electrical signals to the computing system 200. The computing system 200 can receive the electrical signals and execute the projection engine 220 in response to receiving the electrical signals. The projection engine 220 can decode location information from the electrical signals. The projection engine 220 can query the physical objects database 230 using the location information to retrieve products disposed in the facility with in a predetermined distance of the location of the scanner. The projection engine 220 can determine if a second set of information associated with a set of like products, can be projected onto the shelving unit in which the products are disposed. For example, the projection engine 220 can determine a set of like products are running out of stock in the retail store and an employee of the retail store is walking by the set of like products with a scanner 260. Accordingly projection engine 220 can determine, the second set of information can be projected onto the shelving unit for the set of like products to inform the employee the set of like products is running low in stock. The projection engine 220 can query the facilities database to determine the closest projector 240 to the set of like products. The projection engine 220 can control the determined closest projector 240 to change the projected image of the first set of information associated to the set of like products to the projected image of the second set of information associated with the set of like products.

In some embodiments, the scanner 260 can encode scanner information in electrical signals along with the location information and transmit the electrical signals to the computing system 200. For example, the scanner information scan be a serial number for the scanner 260. The serial number can identify which employee the scanner 260 is assigned and/or whether the scanner 260 is being operated by a customer.

In some embodiments, a store employee can stock or restock shelving units with new products. The store employee can transmit an encoded signal using the scanner 260 to the computing system 200. The encoded signal can include the an identifier associated with the new products disposed on the shelving unit and the location of the scanner. The projection engine 220 can receive the encoded signal and decode the identifier from the signal. The projection engine 220 can query the facilities database 245 to retrieve the closest projector 240 to the location of the scanner and query the physical objects database 230 to retrieve information associated with the products. The projection engine 220 can instruct the closest projector 240 to the location of the scanner to project an image of the information associated with the products on the front face of the shelving unit.

The computing system 200 can receive electrical signals encoded with the scanner information and the location information and execute the projection engine 220 in response to receiving the electrical signals. The projection engine 220 can query the physical objects database 230 to determine the products disposed within a predetermined distance of the location of the scanner. Furthermore, the projection engine 220 can query the facilities database 245 to determine the type of user operating the scanner 260. The projection engine 220 can determine whether a second set of information associated with a set of like products disposed within a predetermined distance of the location of the scanner 260 can be projected based on an element of the second set of information and the type of user operating the scanner 260. For example, the projection engine 220 can determine there is a special promotion included in the second set of information associated with a set of like products and a customer is walking by the set of like products operating the scanner 260. Alternatively, the projection engine 220 can determine the set of like products is going out of stock and an employee is walking by the set of like products operating the scanner 260. The projection engine 220 can query the facilities database 245 to determine the closest projector 240 to the set of like products and control the determined closest projector 240 to project the image of the second set of information associated with the set of like products.

Figure 3:
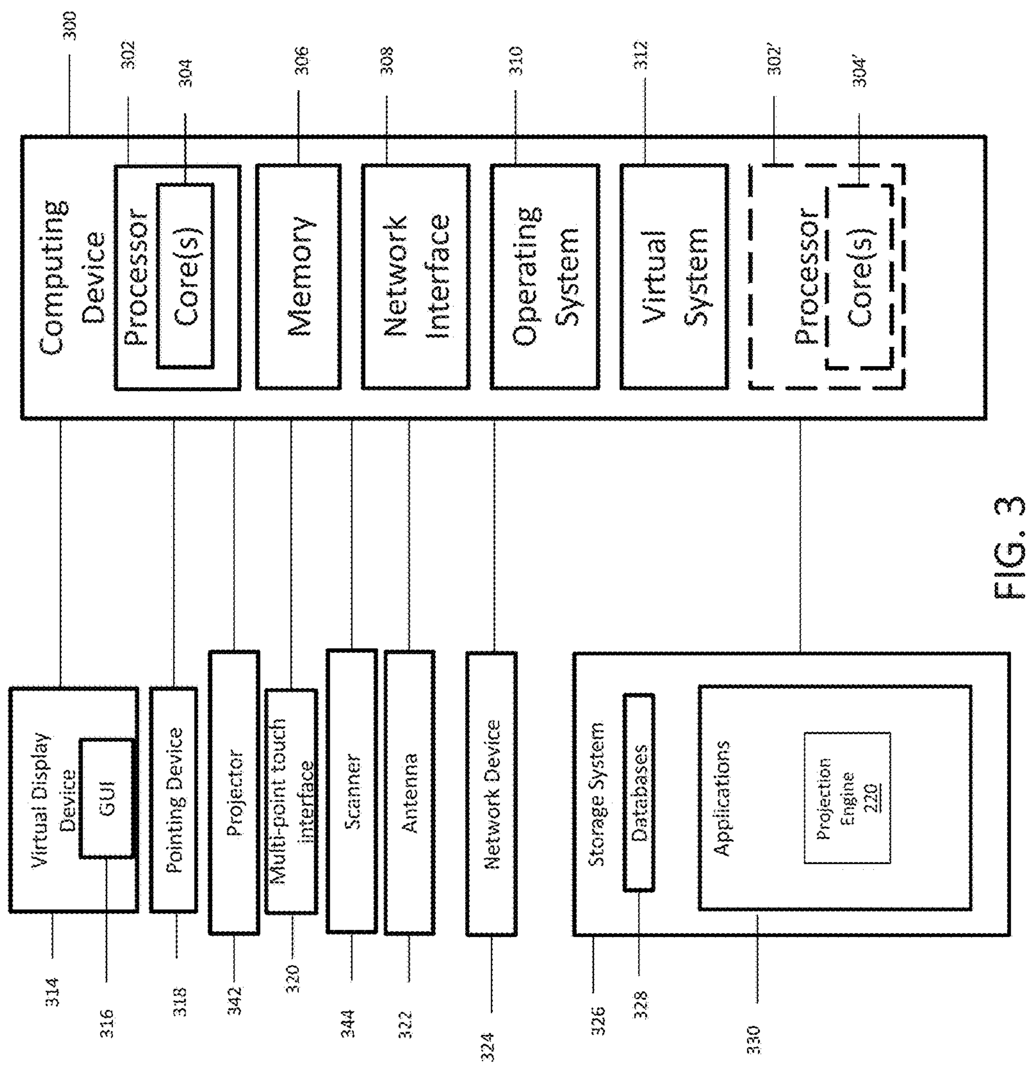
FIG. 3 illustrates an exemplary computing device in accordance with exemplary embodiments of the present disclosure.

FIG. 3 is a block diagram of an example computing device 300 for implementing exemplary embodiments of the present disclosure. Embodiments of the computing device 300 can implement embodiments of the projection engine. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the projection engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320 an scanner 344, a projector 342 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding the physical objects, projectors 342 and scanners 344. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
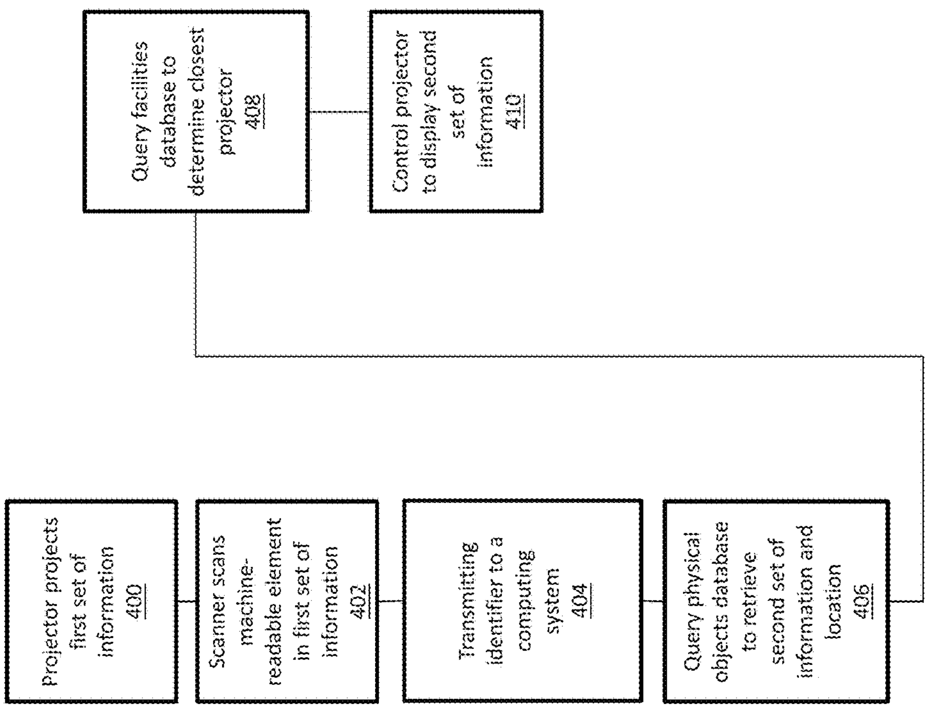
FIG. 4 is a flowchart illustrating a dynamic projection process based on a received identifier according to exemplary embodiments of the present disclosure.

FIG. 4 is a flowchart illustrating a process implemented by an dynamic projection system using an identifier according to exemplary embodiments of the present disclosure. In operation 400, a projector (e.g. projector 102, 122*a-b*, 126*a-b* and 240 as shown in FIG. 1A-2) can display a first set of information on an image of a projected label (e.g. projected label 110 as shown in FIG. 1A) associated with a set of like physical objects (e.g. physical objects 112 as shown in FIG. 1A) on a front portion (e.g. front portion 116*a-c* as shown in FIG. 1A) of shelves (e.g. shelves 114*a* as shown in FIG. 1A) of shelving units (e.g. shelving units 108, 120*a-c*, 124*a-c* as shown in FIG. 1A-B). The first set of information can include a machine-readable element encoded with an identifier associated with the set of like physical objects. The image of the projected label can be projected at a predetermined pulse rate. In operation 402, a scanner (e.g. scanner 115 and 260 as shown in FIGS. 1A and 2) can scan and decode the identifier from the machine-readable element of the image of the projected label. The scanner can be an optical scanner that can determine the pulse rate of the projected image of the projected label. The scanner can decode the identifier based on the pulse rate. In operation 404, the scanner can transmit the identifier to a computing system (e.g. computing system 200 as shown in FIG. 2). The computing system can execute the projection engine (e.g. projection engine 220 as shown in FIG. 2) in response to receiving the identifier.

In operation 406, the projection engine can query the physical objects database (e.g. physical objects database 230 as shown in FIG. 2) using the identifier to retrieve a second set of information and a location of the set of like physical objects associated with the identifier. In operation 408, the projection engine can query the facilities database (e.g. facilities database 245 as shown in FIG. 2) using the location of the set of like physical objects to retrieve the identity of the projector projecting the first set of information into the shelf. In operation 410, the projection engine can control the identified projector to dynamically project the second set of information in place of the first set of information.

Figure 5:
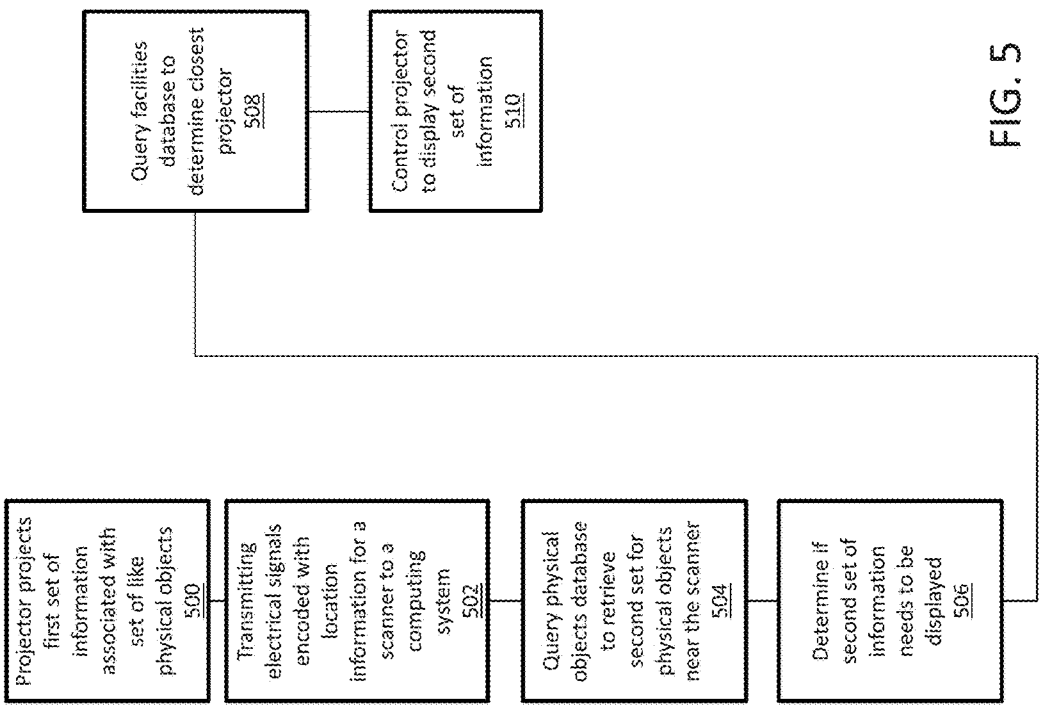
FIG. 5 is a flowchart illustrating a dynamic projection process based on location information according to exemplary embodiments of the present disclosure.

FIG. 5 is a flowchart illustrating a process implemented by an dynamic projection system using location according to exemplary embodiments of the present disclosure. In operation 500, a projector (e.g. projector 102, 122*a-b*, 126*a-b* and 240 as shown in FIG. 1A-2) can display a first set of information on an image of a projected label (e.g. projected label 110 as shown in FIG. 1A) associated with a set of like physical objects (e.g. physical objects 112 as shown in FIG. 1A) on a front portion (e.g. front portion 116*a-c* as shown in FIG. 1A) of shelves (e.g. shelves 114*a* as shown in FIG. 1A) of shelving units (e.g. shelving units 108, 120*a-c*, 124*a-c* as shown in FIG. 1A-B). The first set of information can include a machine-readable element encoded with an identifier associated with the set of like physical objects. The image of the projected label can be projected at a predetermined pulse rate. In operation 502, a location module (e.g. location module 118 as shown in FIG. 1A) located within a scanner (e.g. scanner 115 and 260 as shown in FIGS. 1A and 2) can encode location information for the scanner in electrical signals and transmit the electrical signals to the computing system (e.g. computing system 200 as shown in FIG. 2). The computing system can execute the projection engine (e.g. projection engine 220 as shown in FIG. 2) in response to receiving the electrical signals. Alternatively, the scanner can be implanted as a beacon generating device configured to generate beacons after predetermined time intervals and receivers (e.g. receivers 255 as shown in FIG. 2) disposed around the facility can detect the beacon signals and the strength of the beacon signals. The beacon signals can include identifiers of the scanner 260. The receivers can encode the beacon signals and the strength of the beacon signals into electrical signals and transmit the electrical signals to the computing system.

In operation 504, the projection engine can decode the location information from the electrical signals and query the physical objects database (e.g. physical objects database 230 as shown in FIG. 2) using the location information to determine the physical objects disposed within a predetermined location of the scanner. In operation 506, the projection engine can query the physical objects database to determine whether a second (or third) set of information for physical objects within a predetermined distance to a scanner can be projected and/or a set of information associated with the scanner can be projected. In operation 508, the projection engine can query the facilities database (e.g. facilities database 245 as shown in FIG. 2) to retrieve the closest projector to a set of like physical objects for which a second set of information can be projected and/or based on the location information of the scanner. In operation 510, the projection engine can control the determined closest projector to project the image of the second (or third) set of information on the projected label or an image of a set of information associated with the scanner.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A dynamic projection system comprising:

a projector configured to project a first set of information associated with a set of like physical objects onto a front portion of a shelving unit, wherein the first set of information includes an image of a machine-readable element encoded with an identifier associated with the set of like physical objects;

an optical scanner configured to scan the image of the machine-readable element and decode the identifier from the machine-readable element; and a computing system communicatively coupled to the projector and the optical scanner, the computing system programmed to: query a database using the identifier to retrieve a second set of information associated with the set of like physical objects; and control an output of the projector to dynamically project the second set of information associated with the set of like physical objects onto the front portion of the shelving unit in place of the first set of information associated with the set of like physical objects in response to the optical scanner scanning the image of the machine-readable element, wherein the optical scanner is configured to scan the image of the machine-readable element by detecting a pulse rate at which the projector renders the image.

2. The system in claim 1, wherein the front portion of the shelving unit is at a predetermined angle and the projector is configured to project the first and second sets of information at the predetermined angle.

3. The system in claim 1, wherein the projector is configured to render the first set of information in a first color and render the second set of information in a second color.

4. The system in claim 1, wherein the optical scanner further comprising a location module configured to output location information associated with the optical scanner to the computing system.

5. The system in claim 4, wherein the computing system is further programmed to output a third set information in response to a location of the optical scanner by: determining the location of the optical scanner in response to receipt of the location information; querying the database to retrieve an identification of a set of like physical objects disposed at the location; identifying the projector as being closest in proximity to the location of the optical scanner; and controlling the projector to output the third set of information on the front portion of the shelving unit.

6. The system in claim 1, wherein the pulse rate is unique to the identifier encoded in the image of the machine-readable element.

7. The system in claim 6, wherein the optical scanner decodes the identifier from the machine-readable element based on the pulse rate.

8. The method in claim 1, wherein the pulse rate is unique to the identifier encoded in the image of the machine-readable element.

9. The method in claim 8, further comprising decoding, via the optical scanner, the identifier from the machine-readable element based on the pulse rate.

10. A dynamic projection method comprising:

projecting, via a projector, a first set of information associated with a set of like physical objects onto a front portion of a shelving unit, wherein the first set of information includes an image of a machine-readable element encoded with an identifier associated with the set of like physical objects;

scanning, via an optical scanner, the image of the machine-readable element;

decoding, via the optical scanner, the identifier from the machine-readable element;

querying, via a computing system, a database using the identifier to retrieve a second set of information associated with the set of like physical objects; and controlling, via the computing system, an output of the projector to dynamically project the second set of information associated with the set of like physical objects onto the front portion of the shelving unit in place of the first set of information associated with the set of like physical objects in response to the optical scanner scanning the image of the machine-readable element, wherein scanning, via the optical scanner, the image of the machine-readable element comprises detecting a pulse rate at which the projector renders the image.

11. The method in claim 10, further comprising projecting, via the projector, the first and second sets of information at a predetermined angle, wherein the front portion of the shelving unit is at the predetermined angle.

12. The method in claim 10, further comprising:

rendering, via the projector, the first set of information in a first color; and rendering, via the projector, the second set of information in a second color.

13. The method in claim 10, further comprising outputting, via a location module included in the optical scanner, location information associated with the optical scanner to the computing system.

14. The method in claim 13, further comprising outputting, via the computing system, a third set information in response to a location of the optical scanner.

* * * * *